(12) United States Patent
Davis

(10) Patent No.: US 9,198,443 B2
(45) Date of Patent: Dec. 1, 2015

(54) FOOD SMOKER APPARATUS

(76) Inventor: George Michael Davis, Pensacola, FL (US)

( * ) Notice: Subject to any disclaimer, the term of this patent is extended or adjusted under 35 U.S.C. 154(b) by 279 days.

(21) Appl. No.: 13/066,184

(22) Filed: Apr. 8, 2011

(65) Prior Publication Data

US 2011/0247505 A1    Oct. 13, 2011

Related U.S. Application Data

(60) Provisional application No. 61/342,181, filed on Apr. 10, 2010.

(51) Int. Cl.
| B65D 81/20 | (2006.01) |
|---|---|
| A47J 27/04 | (2006.01) |
| A21D 2/00 | (2006.01) |
| A21D 8/02 | (2006.01) |
| A23B 4/052 | (2006.01) |

(52) U.S. Cl.
CPC ..................... *A23B 4/052* (2013.01)

(58) Field of Classification Search
CPC .......... A23B 4/044; A23B 4/052; A47J 47/10
USPC ......... 99/472, 473; 126/17, 19.5, 1 R, 110 R, 126/25 B
See application file for complete search history.

(56) References Cited

U.S. PATENT DOCUMENTS

| 4,044,785 | A * | 8/1977 | Larsen ........................... 137/75 |
|---|---|---|---|
| 5,368,872 | A * | 11/1994 | Davis, Jr. ..................... 426/281 |
| 6,409,803 | B1 * | 6/2002 | Tremel et al. ................. 95/271 |
| 2009/0004348 | A1 * | 1/2009 | Silva ............................ 426/315 |
| 2011/0151071 | A1 * | 6/2011 | Ablett ................... A23B 4/052 426/129 |

* cited by examiner

*Primary Examiner* — Dana Ross
*Assistant Examiner* — Lindsey C Teaters
(74) *Attorney, Agent, or Firm* — Dickinson Wright PLLC

(57) ABSTRACT

This invention is a food preparation device used for imparting the flavor of smoke to foods by saturating the food with smoke in minutes, using very small amounts of wood or other smoke producing material, and upon completion of the process the food can be refrigerated, re-refrigerated, or cooked in any manner desired by the user. Efficiency of time and material is achieved by a unique design that allows a minute amount of smoke producing material to be ignited in a small ignition chamber before being transferred to a chamber containing the food in a partial vacuum created by a vacuum/compression pump, and through the unique design of valves and connector pipes the smoke filled chamber containing the food is subsequently subjected to compression by the vacuum/compression pump, thus leaving the food in the chamber smoke saturated within a few minutes of operation with little or no change in temperature.

10 Claims, 1 Drawing Sheet

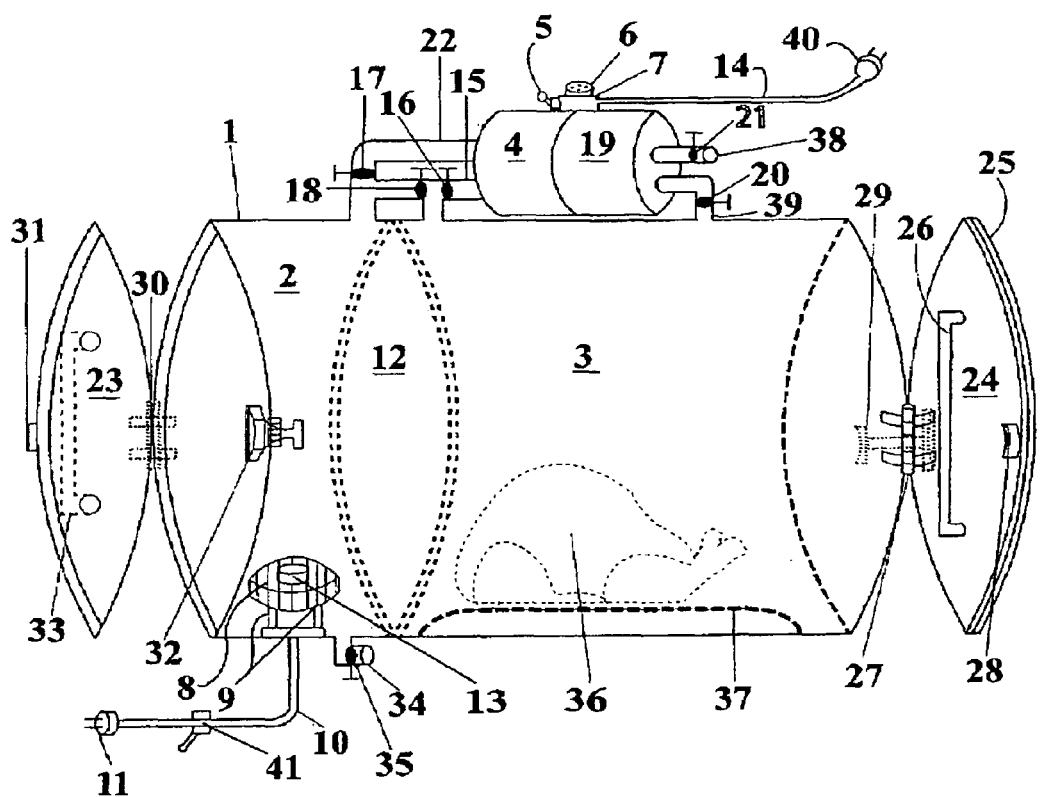

FOOD SMOKER APPARATUS

I claim the benefit of the filing date of the provisional patent application: U.S. 61/342,181 filed on Apr. 10, 2010.

REFERENCES CITED REFERENCED BY

| U.S. Patent Documents | | |
|---|---|---|
| 4,130,052 | December 1978 | Jacobson |
| 4,469,020 | September 1984 | Hamilton et al. |
| 5,368,872 | November 1994 | Davis Jr. |

BACKGROUND OF THE INVENTION

The food smoker apparatus according to the present invention is a food and beverage apparatus designed to subject food to an enclosed modified atmosphere using vacuum and compression means for exposing the food to smoke for the purpose of adding smoke flavor to the food. Modern man is no exception to the past when it comes to the desire to utilize the flavor enhancing qualities of the smoke produced by the burning of wood, charcoal or any other vegetable matter used in the process of cooking our food. To this day the techniques for doing this are not very far removed from the techniques used by our earliest ancestors who realized that the smoke from cooking food did actually alter the flavor of the food being prepared; and at some point long ago there came the realization that the more prolonged the exposure of the food being prepared to smoke, the more smoke enhanced the flavor of the food would be.

Until now the most modern contrivances available in our otherwise high tech world for achieving this enhanced smoke flavoring still involved prolonging the exposure of the food to the smoke. Today's most modern smokers may be somewhat easier to use than the wood burning type, but they still require many hours of exposure to the smoke in order to achieve the desired level of flavor enhancement; or the use of chemical or liquid smoke flavorings which require the food to be bathed, soaked or otherwise saturated with the liquid and are widely considered to deliver results quite inferior to the effects of real smoke.

Clearly there is a need in the art for a new food smoker apparatus to provide for an efficient, and very rapid process for utilizing smoke produced from the burning of traditional materials such as wood, charcoal or a variety of vegetable matter to enhance the flavor of a variety of foods and to do so with little or no transfer of heat or heat dried air to the food itself.

Historically the search for a better smoker has been a little like the proverbial search for a better mouse trap as others have attempted to create new and improved methods for the smoking of meat and other food substances.

Some prior inventions have attempted to combine the processes of smoking and cooking food with pressurization being applied either to a fire chamber or a food chamber; for example, Hamilton et all, (U.S. Pat. No. 4,469,020) discloses an apparatus with a smoke generator that would pump smoke into a separate enclosure containing the food being cooked by a heating element.

A shortcoming of the method described by Hamilton is pointed out by Davis Jr. (U.S. Pat. No. 5,368,872). The shortcoming he points out is the necessity of pumping smoke through a compressor, thus fouling the internal components of the compressor over time, and even though a filtration system could protect the compressor, it would also presumably remove much or all of the smoke which is essential to the process of smoking the food.

While the apparatus claimed by Davis Jr. can be seen as an improvement over the apparatus claimed by Hamilton et al, (U.S. Pat. No. 4,469,020), there are still important features in the apparatus described by Davis Jr. that would be limitations to the achievement of efficiency in the use of time and fuel. One such limitation to the invention described by Davis Jr. is that the fire compartment 12 illustrated in his drawings (FIG. 1) requires a specialized door compression device 68 illustrated in his drawing (FIG. 5) operating in conjunction with the door 40 illustrated in (FIG. 2) and the door receiving structure 44 illustrated in (FIG. 3) in order to accommodate the necessity of repeatedly sealing and pressurizing the interior of the fire compartment 12 (FIG. 1) before repeatedly transferring pressurized smoke filled air to the interior of the pressure smoking compartment 14 (FIG. 1), which is in direct thermal communication with the fire compartment 12 (FIG. 1) such that the temperature within the pressure smoking compartment 14 (FIG. 1) can be regulated by regulating the fire in the fire compartment 12 (FIG. 1).

The apparatus described by Davis Jr. also limits the user to a process which results in the transfer of heat as well as smoke filled air by a source of pressurized air 77 (FIG. 1) into the pressure smoking compartment 14 (FIG. 1) which causes a complete or partial cooking of the food within the pressure smoking compartment 14 (FIG. 1) during the food smoking process, and there is nothing in the claims put forth by Davis Jr. that would suggest this complete or partial cooking is not intended to be part of the smoking process. Furthermore there is nothing that Davis Jr. teaches that would suggest that his apparatus was intended to accomplish, or even could accomplish, the complete saturation of food with smoke without ever subjecting the food to heat or forced air, thus leaving the food essentially unaffected by either, and in a state of being fully saturated with smoke flavor yet capable of being returned to refrigeration with smoke saturation being the only change affected or, of being cooked by any method desired such as: frying, baking, grilling, microwaving, steaming, etc. after the smoke saturation process has occurred.

Another limitation of the apparatus described by Davis Jr. is the necessity of having three separate compartments, one being the fire compartment 12 (FIG. 1) where fuel is burned to generate the smoke, a separate pressure smoking compartment 14 (FIG. 1) in thermal communication with the fire compartment 12 (FIG. 1) and a separate vacuum smoking compartment 16 (FIG. 1) also in direct thermal communication with the fire compartment 12 (FIG. 1) and the arrangement of the three compartments makes it necessary that the apparatus be used either: as a pressurized smoker and cooker; or be used as a device that smokes and cooks or cures food in a partial vacuum.

Another limitation of the invention described by Davis Jr. is the requirement for the continuous operation of a vacuum pump 93 (FIG. 1) in order to create a partial vacuum in the vacuum smoking compartment 16 (FIG. 1) and also requires a vacuum pump filter 92 (FIG. 1) in order to protect the vacuum pump 93 (FIG. 1) as it continuously removes air from the vacuum smoking compartment 16 (FIG. 1).

Another limitation of the apparatus described by Davis Jr. teaches the use of separate components for the processes of partial vacuum creation and air compression as can be seen in (FIG. 1) illustrating the preferred embodiment of the apparatus and showing the vacuum pump 93 situated on one side of the preferred embodiment of the apparatus (FIG. 1) and the source of pressurized air 77 on the opposing side of the preferred embodiment of the apparatus (FIG. 1).

Davis Jr. also teaches the capability for expedited removal of moisture from the food in his apparatus resulting from the exposure to pressurized and heated smoke from the fire compartment 12 (FIG. 1) or from continuous exposure to the partial vacuum created in the vacuum smoking compartment 16 (FIG. 1). While there can be no doubt that exposure to these processes would have this effect, it is by no means certain that such a drying effect would be universally desirable and there is no claim or indication by Davis Jr. that his invention could operate without causing a removal of moister from the food being smoke treated.

Although others such as Davis Jr., Hamilton et all, and Jacobson (U.S. Pat. No. 4,130,052) have disclosed earlier inventions aimed at improving the process of smoking and cooking certain foods; to date, there is nothing in the art which seriously departs from the requirement to utilize sizable amounts of smoke producing fuel, and the need to subject the food to be smoked to heat (whether produced by the smoke producing fire or a separate source of heat) for a considerable amount of time and furthermore, there is nothing in the art to date which contemplates the possibility of a process for saturating a food product with real smoke without significantly altering the temperature or moisture content of the food product.

The greatest shortcoming of all of the apparatus described in the art until now has been the considerable inefficiency of time and material and the difficulty of achieving significant precision in the essential process of generating smoke and infusing the food with smoke, and there is virtually nothing in the art which effectively addresses the possibility of infusing a food product with real smoke saturation without significantly altering other characteristics of the food product in ways which may or may not be desirable.

Given the current limitations in the art cited above, it is evident that there is a need in the art for a smoker apparatus that:

1. Departs from the idea that the burning of wood or other material to produce smoke, and the cooking of the food have to be either part of the same process; or the smoking of the food has to be done over a prolonged period of time so as to affect a simultaneous slow cooking or curing of the food.

2. Departs from the need for any specialized door compression device for the compartment or chamber used as a means for the production of smoke such as that taught by Davis Jr. (FIG. 5) in his drawings, but instead can operate with a simple flush fitting door that would simply cut off the flow of air when tightly closed allows for the production of just enough smoke to saturate the food, thereby requiring very small amounts of material to be burned to produce the smoke, very small amounts of heat to be produced, and little or no transfer of heat to the food to be smoked.

3. Allows for the production of just enough smoke to saturate the food, thereby requiring very small amounts of material to be burned to produce the smoke, very small amounts of heat to be produced, and little or no transfer of heat to the food to be smoked.

4. Can be done over a very short period of time and using vacuum/compression components that have no exposure to heat or harmful smoke while providing the means to fully and deeply saturate the food with the flavor of real smoke in a matter of minutes.

5. Provides the means for separating and isolating the smoke, which is the desired source of flavor to be imparted unto a food substance, from the flame and heat source created to produce the smoke in a manner which the restricts the alteration of the food substance to that affected by exposure to the smoke alone with the effect of the heat and flame used to generate the smoke being negligible or none at all.

6. Provides for the rapid creation of a partial vacuum in a sealed chamber containing a food product whereby smoke saturated air can be transferred from a small ignition source in an adjacent chamber, and this is accomplished with negligible thermal transfer thus allowing for the subsequent compression of the smoke saturated air in the sealed chamber containing the food product which then becomes saturated with smoke while undergoing no significant change in temperature.

7. Allows the vacuum and compression processes described above to take place within a single chamber or compartment which can be sealed in such a manner that allows for compression and partial vacuum creation using any one of several simple rubber gasket sealing means long established in the art.

8. Provides the means for the saturation of a food product with real smoke and leaves that food product in an otherwise unaffected state such that it can be later cooked in any manner desired while retaining the effect of smoke flavoring.

9. Provides the means for the saturation of a food with real smoke in such a way that most or all of the smoke produced is absorbed by the food being treated by the smoke, and as a result there is no requirement in the process for the smoke to be filtered in any way during the smoking process or after the smoking process is complete.

While Davis Jr., Hamilton et al, and others have taught various means for incorporating schemes for pressurization and/or partial vacuum creation into the process of smoking and/or cooking food, none of their inventions to accomplish these goals could be reasonably modified to accomplish the needs in the art described above and there is nothing in their descriptions, drawings, or claims to indicate that any of them had any intentions of teaching these things or that it would have been obvious to them to do so.

BRIEF SUMMARY OF THE INVENTION

The food smoker apparatus according to the present invention is based upon the need to overcome the limitations, restrictions and shortcomings in the art previously described. The object of this invention is addressed to the challenge of finding a way to infuse food with the flavor enhancing qualities of real smoke in a way that is faster and more efficient than the practices commonly in use today, in either commercial or homemade smokers or grills, which consist of exposing the food product to smoke in an enclosed area over varying periods of time, and are generally restricted to being accomplished while in the process of also cooking or curing the food. Considerable amounts of time, material, and heat generation are necessary for the methods commonly in use today.

The method of the present invention is based upon the application of a few basic principles of physics (regarding the creation of vacuums and pressurized environments) to infuse food with a desired level of smoke flavoring within a matter of minutes using small quantities of material such as wood, charcoal, mesquite, etc. which can be ignited in a specialized chamber containing a specialized designed burn plate ignition means to receive and ignite through heat transfer a small amount of smoke producing material so as to produce small amounts of smoke; the smoke then being incorporated into a vacuum and/or pressure chamber in a manner that will render the food which has been placed inside that chamber to be saturated with smoke and subsequently, the food can then be baked, fried, grilled or otherwise cooked in an method desired and upon completion of the cooking process, the food will upon being consumed, impart the flavor of smoke consistent with the material burned to produce that smoke.

A central feature of the food smoker apparatus according to the present invention is that a food product can be infused with smoke flavor thoroughly and quickly in a very short period of time by placing the food product into a chamber capable of holding varying levels of vacuum or withstanding varying levels of pressurization; and when smoke is pulled from a separate smoke producing chamber into the chamber containing the food product through a valve or series of valves and compression lines or tubing which separate the two chambers, and this happens after a vacuum has been created inside the chamber containing the food product so that the smoke is subsequently pulled into every vacant space opening or otherwise exposed surface within the food product. The valve between the two chambers can then be closed and the smoke flavor of the food product can also be further enhanced by subjecting the food product inside the chamber (containing the food product under partial vacuum) to pressurization.

Another central feature of the food smoker apparatus according to the present invention is the unique design and arrangement of the various components of the apparatus such that the limitations to the apparatus and methods described by Davis Jr., (U.S. Pat. No. 5,368,872), Hamilton et al., (U.S. Pat. No. 4,469,020), Jacobson, (U.S. Pat. No. 4,130,052) and others are overcome by the following characteristics of the present invention:

1. The vacuum/compressor components are combined in a single unit that is mounted away from the heat and smoke producing source so that those components are never exposed to significant amounts of heat and are mounted in such a way that the entire apparatus is streamlined and compact.

2. The vacuum/compressor components, compression lines (could also be tubing or hoses) and adjustable or controllable valves, operate in conjunction with one another in such a way as to never require smoke saturated air to pass through the vacuum/compressor pumps themselves because the movement of the smoke from the smoke generation chamber is accomplished solely because the vacuum (created within the vacuum/compression chamber containing the food) pulls the smoke directly from the smoke generating means within the smoke generation chamber.

3. The smoke generating means is very small and compact and capable of being mounted in a small and compact compartment or chamber and capable of generating a relatively small amount of smoke using a small amount of wood or other smoke producing material, thus also producing an insignificant amount of heat or flame.

4. The vacuum/compression chamber containing the food product to be treated with smoke is separated from and not directly exposed to the small amount of heat or flame used to create the smoke thus leaving the food product unaffected by heat or flame while being very saturated with the relatively small amount of smoke that is generated in the separate chamber containing the smoke generating means.

5. The vacuum/compression chamber eliminates the need for any filtration for the purpose of removing excess smoke upon completion of the process as virtually all of the smoke generated by the smoke generating means is absorbed by the food in the vacuum/compression chamber.

BRIEF DESCRIPTION OF THE VIEW OF THE DRAWING

The FIGURE is a sectional front perspective view, partially schematic, of the entire food smoker apparatus showing the major components of the apparatus including the ignition/burn chamber, the vacuum/pressure chamber, the vacuum pump, and the compressor pump, and also showing: the ignition element inside the ignition/burn chamber, and also showing the pipes (could also be copper tubing or rubber hoses) connecting the interior of the vacuum/pressure chamber and the ignition/burn chamber with each other and with the atmosphere outside of the chambers, and also showing are a series of valves used to open and shut off connections between the two chambers or, connections between said chambers and the atmosphere outside of the chambers, as needed for the process of treating the food item inside of the vacuum/pressure chamber for smoke flavoring, and also showing exterior hinged access doors for both the ignition/burn chamber and the vacuum/compression chamber, and also showing hinges, rubber gaskets, and door latches which allow the vacuum/pressure chamber to be shut in such a way as to create air tight seals between the outside atmosphere and the interior of the vacuum/compression chamber when the doors are clamped shut, (note that the ignition/burn chamber does not require a rubber gasket as some air seepage into this chamber is not a problem), and also showing in the FIGURE are electrical outlets and electrical supply cords, switches and plugs which connect the vacuum/compressor pump and the ignition/burn element, inside the ignition/burn chamber, to an electrical power supply, and also showing is the on/off power switch and control knob for the vacuum pump and compressor pump.

The FIGURE also shows a food rack supporting the meat or food product and also shows a pipe protruding from the bottom of the ignition/burn chamber containing an adjustable valve.

DETAILED DESCRIPTION OF THE INVENTION

The FIGURE shows the food smoker apparatus 1 which can be of various dimensions and shapes and constructed of a variety of materials and the preferred embodiment of the apparatus will usually be fabricated from steel, aluminum, or some other metal strong and durable enough to withstand the stresses caused by the creation of internal or external pressure resulting from causing vacuum and pressurization or heat within the chambers created in the fabrication of this apparatus.

The food smoker apparatus 1 shown in the FIGURE consists of four major components including: the ignition/burn chamber 2, the vacuum/compression chamber 3, and the vacuum pump 19 and the compressor pump 4. Also shown in the FIGURE are other essential components of the food smoker apparatus 1; starting with the ignition/burn chamber door 23, the ignition/burn chamber door handle 33, the ignition/burn chamber door hinge 30, the ignition/burn chamber door latch mechanism 32, and the ignition/burn chamber door mounted latch receiver 31. Also shown in the FIGURE are the vacuum/compression chamber door 24, the vacuum/compression chamber door handle 26, the vacuum/compression chamber door hinge 27, the vacuum/compression chamber door latch mechanism 29, and the vacuum/compression chamber door mounted latch receiver 28.

Also shown in the FIGURE is the chamber wall 12 which separates the ignition/burn chamber 2 and the vacuum/compression chamber 3 and is constructed of the same material as the outer walls of the food smoker apparatus 1.

Also shown in the FIGURE is the on/off power switch 5, and control setting dial 6, and circuitry casing 7 mounted on top of the vacuum pump 19 and compressor pump 4 and connected to an electrical supply source by a 120 volt electrical cord 14 with a 120 volt electrical plug 40. Also shown in the FIGURE, inside of the ignition/burn chamber 2 is the ignition/burn plate 8 which is connected to electrical supply by wire conduits 9 which connect to a 120 volt electrical cord 10 attached to a 120 volt electrical plug 11 which will plug into a standard 120 volt electrical outlet to supply electricity to the ignition/burn plate 8 when power switch 41 is turned on so that the ignition burn plate 8 will provide the heat to ignite the wood disc or other smoke generating material 13 which will subsequently burn and create smoke which will accumulate inside of the ignition/burn chamber 2, and which will subsequently be pulled into the vacuum/compression chamber 3, through the pipe 15 when the valve 16 inside of the pipe 15 is closed and the valve 18 inside of the pipe 15 is opened and the valve 17 inside the pipe 22 is closed; this occurring after a vacuum has been created in the vacuum/compression chamber 3 by turning the control setting dial 6 to engage the vacuum pump 19, which when activated will pull air out of the vacuum/compression chamber 3 when valve 20 inside of pipe 39 and valve 21 inside of pipe 38 are opened while valve 16 inside of pipe 15 and valve 17 inside of pipe 22 are closed.

After the desired amount of air has been pulled out of the vacuum/compression chamber 3 and the desired amount of smoke has been pulled into the fiber of the meat or food substance 36 within the vacuum/compression chamber 3, the atmosphere inside the vacuum/compression chamber 3 can be held constant for a desired period of time by closing valve 18 inside of pipe 15 and also closing valve 20 inside of pipe 39 and continuing to keep valve 16 in pipe 15 and valve 17 in pipe 22 closed.

The atmosphere inside of the vacuum/compression chamber 3 can also subsequently be subjected to compression by turning the control dial 6 to engage the compressor pump 4 which will, when activated, compress the atmosphere within the vacuum/compression chamber 3 when valve 20 inside of pipe 39 and valve 21 inside of pipe 38 are closed and valve 16 inside of pipe 15 and valve 17 inside of pipe 22 are open and valve 18 inside of pipe 15 is closed and valve 35 inside of pipe 34 is opened, the subsequent compression of the air within the vacuum/compression chamber 3 will cause a further penetration of the meat or food substance within by the smoke saturated air which has been previously pulled by vacuum out of the ignition/burn chamber 2.

Also shown in the FIGURE is valve 35 inside of pipe 34 located on the bottom of the ignition/burn chamber 2 which can be opened when the ignition/burn chamber door 23 is closed to allow more air to be pulled into the ignition/burn chamber 2 during the burning of the wood chip or other smoke generating material 13 and to allow a continuous flow of smoke to be pulled through the ignition burn chamber 2 and into the vacuum/compression chamber 3 during the compression phase of the operation of the food smoker apparatus 1.

When the sequence of vacuum creation, smoke introduction, and finally compression of smoke saturated air is repeated several times, it has the effect of causing smoke to be pulled and pushed deep into the meat or food substance 36 that has been placed inside of the vacuum/compression chamber 3 during this process.

While the basic invention has been disclosed it is understood that it is my intention that my invention is not to be limited to such disclosures since it may be expanded through the application of my basic invention principles. Also, it should be understood that changes and modifications in the form, construction, materials used for construction, arrangements of the components, as well as the automation of some of the processes described in the detailed description of the invention may be made without departing from the nature and principles of my invention.

What is claimed is:

1. A food preparation apparatus utilizing vacuum and pressurization to saturate a food substance with smoke flavor very quickly and efficiently while using very small amounts of smoke producing fuel, the apparatus comprising:
   (a) an ignition and burn chamber having an ignition/burn device adapted so that a small amount of wood or other smoke producing material can be ignited to produce smoke within the confines of said ignition/burn chamber in sufficient quantities to be pulled into an adjacent and separate vacuum/compression chamber containing meat or other food and capable of holding a partial vacuum and sustaining a compressed atmosphere;
   (b) a vacuum pump for creating a partial vacuum in the vacuum/compression chamber containing the meat or other food and drawing smoke from the ignition/burn chamber into the vacuum/compression chamber;
   (c) a compressor for creating a pressurized atmosphere in the vacuum/compression chamber containing the meat or other food for pressurizing the smoke in contact with the meat or other food;
   (d) a smoke transfer pipe for transferring the smoke created in the ignition/burn chamber by the vacuum created in the vacuum/compression chamber containing meat or other food.

2. The food preparation apparatus according to claim 1 wherein;
   (a) the ignition/burn chamber includes a specialized ignition/burn plate which can be regulated to cause a small amount of smoke producing material to be burned for a specific period of time for the purpose of generating a quantity of smoke; and
   (b) an air inlet having an adjustable valve in said ignition/burn chamber for increasing or decreasing the amount of outside air allowed into the ignition/burn adapted chamber so that the amount of smoke generated can be controlled by adjusting the valve.

3. The food preparation apparatus according to claim 1 further comprising:
   (a) specialized arrangement of tubing or compression hoses and adjustable valves forming connections between the vacuum pump and compressor, the ignition/burn chamber, and the vacuum/compression chamber, which allows for precise timing and control of smoke transfer from the ignition/burn chamber to the vacuum/compression chamber containing the meat or other food; and which also allows for precise timing and control of the vacuum pump and compressor in the vacuum/compression chamber containing the meat or other food to be smoked; and
   (b) a specialized arrangement and configuration of the tubing, the compression hoses, the vacuum pump and compressor, the burn/ignition chamber, the vacuum/compression chamber and associated adjustable valves which allows for the transfer of smoke generated in the ignition/burn chamber into the vacuum/compression chamber without the smoke ever passing through the components of the vacuum pump or the components of the compressor; and
   (c) a specialized arrangement and configuration of the tubing, the compression hoses, the vacuum pump and compressor, the burn/ignition chamber, the vacuum/compression chamber and the associated adjustable valves which allows for the ignition and burning of smoke generating material in small amounts and for a short period of time resulting in the production of sufficient smoke to saturate the meat or other food without producing excessive amounts of heat or hot air, thus allowing for the restriction of food treatment in the vacuum/compression adapted chamber to that of real smoke saturation only.

4. A food smoking apparatus comprising:

a first closed chamber having a burner configured for burning a combustible smoke generating material and producing a quantity of smoke within said first chamber;

a second closed chamber separate from said first chamber and connected to said first chamber by a pipe, said second chamber configured for receiving a food item and receiving the smoke from the first chamber;

a vacuum pump connected to said second chamber and configured for producing a partial vacuum in said second chamber and drawing the smoke into said second chamber into contact with the food item; and a compressor connected to said second chamber and configured for producing pressure in said second chamber for a time sufficient to treat the food item with the smoke drawn into the second chamber by said vacuum pump substantially without heating the food item.

5. The apparatus of claim 4, wherein said pipe extending between said first chamber and second chamber has a first valve, wherein said valve is configured to close said second chamber when said compressor is actuated to pressurize said second chamber, and where said first valve is configured to open when said vacuum pump is actuated to draw smoke from said first chamber to said second chamber.

6. The apparatus of claim 5, wherein said compressor is connected to said second chamber by a second pipe having a second valve, wherein said second valve is configured to open when said compressor is actuated to pressurize said second chamber and to close when said vacuum pump is actuated to draw smoke from said first chamber into said second chamber.

7. The apparatus of claim 6, wherein said burner is an electrical burner for producing sufficient heat to ignite the combustible smoke generating material substantially without heating the food item.

8. A food smoking apparatus comprising:

a first chamber having an electric burner for igniting a combustible smoke generating material within said first chamber;

a second chamber separate from said first chamber and configured for receiving a food item to be smoked;

a first pipe extending between said first chamber and said second chamber for transferring smoke produced in said first chamber to said second chamber, said first pipe having a first valve for opening and closing communication between said first chamber and said second chamber;

a vacuum pump connected to said second chamber for drawing a quantity of smoke from said first chamber into said second chamber when said first valve is open; and a compressor connected to said second chamber to pressurize said second chamber for a time sufficient to pressure treat the food item with the smoke under pressure when said first valve is closed.

9. The apparatus of claim 8, wherein said vacuum pump is connected to said second chamber by a second pipe having a second valve, said first valve and said second valve configured to open when said vacuum pump is actuated to draw a quantity of smoke from said first chamber into said second chamber and to close when said vacuum pump is deactivated and said compressor is actuated to pressurize said second chamber.

10. The apparatus of claim 9, wherein said compressor is connected to said second chamber by a third pipe having a third valve, wherein said third valve is configured to open when said compressor is actuated to pressurize said second chamber and to close when said vacuum pump is actuated to draw smoke from said first chamber into said second chamber.

* * * * *